United States Patent
Birru et al.

(10) Patent No.: US 7,650,126 B2
(45) Date of Patent: Jan. 19, 2010

(54) METHOD AND SYSTEM FOR THE ALLOCATION OF UWB TRANSMISSION BASED ON SPECTRUM OPPORTUNITIES

(75) Inventors: Dagnachew Birru, Yorktown Heights, NY (US); Stefan Mangold, Ossining, NY (US); Kiran Challapali, New City, NY (US); Javier Del Prado Pavon, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 44 days.

(21) Appl. No.: 10/599,749

(22) PCT Filed: Apr. 4, 2005

(86) PCT No.: PCT/IB2005/051113

§ 371 (c)(1),
(2), (4) Date: Oct. 6, 2006

(87) PCT Pub. No.: WO2005/099293

PCT Pub. Date: Oct. 20, 2005

(65) Prior Publication Data

US 2007/0213084 A1    Sep. 13, 2007

Related U.S. Application Data

(60) Provisional application No. 60/560,442, filed on Apr. 8, 2004, provisional application No. 60/591,405, filed on Jul. 27, 2004.

(51) Int. Cl.
H04B 17/00 (2006.01)
H04B 1/00 (2006.01)
H04B 15/00 (2006.01)

(52) U.S. Cl. .................. 455/226.1; 455/63.1; 455/63.3; 455/513; 370/329; 370/450

(58) Field of Classification Search ............. 455/226.1, 455/63.1, 63.3, 513; 370/329, 450
See application file for complete search history.

(56) References Cited

U.S. PATENT DOCUMENTS 5,794,151 A    8/1998    McDonald (Continued)

FOREIGN PATENT DOCUMENTS

WO    03001742 A1    1/2003

Primary Examiner—Matthew D Anderson
Assistant Examiner—Wen W Huang
(74) Attorney, Agent, or Firm—Larry Liberchuk

(57) ABSTRACT

A method and system for efficiently utilizing frequency spectrum resources is disclosed. The method comprises the steps of determining at least one spectrum opportunity (510), wherein the opportunity is identified by a frequency range and a time duration, determining a set of altered transmission characteristics (515, 517) to allow transmission of a desired signal in the identified frequency range, wherein the altered transmission characteristics avoid interference with signals expected in the frequency range, and transmitting said desired signal using the altered transmission characteristics when the transmission occurs during said time duration. In one aspect of the system, the step of determining at least one opportunity comprises the steps of receiving signals in known frequency ranges, and determining the characteristics of the received signals. The system comprises a receiving unit (1001) for receiving information items regarding at least one receivable signal, a processing unit (862) for determining characteristics of the at least one received signal, a managing unit (864) for altering transmission characteristics of a desired signal based on the determined received signal characteristics, wherein the altered transmission characteristics avoid interference with the received signals and a transmission unit (866) receiving said altered transmission characteristics to transmit said desired signal. In one aspect, the desired signal transmission characteristics are altered in a frequency range/time period to avoid interference with received signals in the frequency range.

14 Claims, 10 Drawing Sheets

Flow Chart for Determining Spectrum Opportunities

U.S. PATENT DOCUMENTS

| | | | |
|---|---|---|---|
| 7,269,151 B2 * | 9/2007 | Diener et al. | 370/329 |
| 2002/0146979 A1 * | 10/2002 | Regulinski et al. | 455/13.1 |
| 2003/0027577 A1 | 2/2003 | Brown | |
| 2003/0050012 A1 * | 3/2003 | Black et al. | 455/62 |
| 2003/0198200 A1 | 10/2003 | Diener | |
| 2004/0008617 A1 | 1/2004 | Dabak | |
| 2004/0047285 A1 | 3/2004 | Foerster | |
| 2004/0077306 A1 | 4/2004 | Shor | |
| 2004/0203987 A1 * | 10/2004 | Butala | 455/522 |
| 2005/0176371 A1 * | 8/2005 | Palin et al. | 455/41.2 |
| 2008/0025378 A1 * | 1/2008 | Mahany et al. | 375/150 |

* cited by examiner

Power Transmission Characteristic Determined

Flow Chart for Determining Spectrum Opportunities

Data Processing Flow

Process Flow of Spectrum Opportunity Manager

System for the Allocation of UWB Transmssion

METHOD AND SYSTEM FOR THE ALLOCATION OF UWB TRANSMISSION BASED ON SPECTRUM OPPORTUNITIES

This application claims priority, pursuant to 35 U.S.C. 119(e), to that provisional application entitled "Cognitive Wideband Radios: Modified Subcarrier Spaces During Measurements", filed on Apr. 8, 2004 and assigned Ser. No. 60/560,442, the contents of which are incorporated by reference herein.

This application relates to wireless communication systems, and more particularly, to Ultra Wide Band and Cognitive Radio technologies and their use in dynamically allocating their transmissions inside and outside their designated operating bands, and transmission power limits.

Conventionally, the frequency bands that are used for television, radio, satellite communications or radar transmission are licensed for the exclusive use of traditional transmission services. This licensing or regulation of the frequency spectrum is conventionally needed to avoid interference between one radio transmission and another. Table 1 illustrates the allocation of conventional VHF television bands in the United States.

TABLE 1

Frequency Allocation of VHF Television Band

| Channel | Center Frequency (MHz) | Band (MHz) | Grade A Coverage | Grade B Coverage |
|---|---|---|---|---|
| 2 | 55.25 | 54-60 | 68 dBu | 47 dBu |
| 3 | 61.25 | 60-66 | 68 dBu | 47 dBu |
| 4 | 67.25 | 66-72 | 68 dBu | 47 dBu |
| 5 | 77.25 | 72-82 | 68 dBu | 47 dBu |
| 6 | 83.25 | 82-88 | 68 dBu | 47 dBu |
| 7 | 175.25 | 174-180 | 71 dBu | 56 dBu |
| 8 | 181.25 | 180-186 | 71 dBu | 56 dBu |
| 9 | 188.25 | 186-192 | 71 dBu | 56 dBu |
| 10 | 193.25 | 192-198 | 71 dBu | 56 dBu |
| 11 | 199.25 | 198-204 | 71 dBu | 56 dBu |
| 12 | 205.25 | 204-210 | 71 dBu | 56 dBu |
| 13 | 211.25 | 210-216 | 71 dBu | 56 dBu |

Typically, the VHF TV signals occupy a six (6) MHz band with the carrier frequency that is skewed toward the lower end of the band. The Grade A and Grade B coverage represent minimum signal power conditions that should be received to obtain a reasonable quality picture. These coverage areas define geographic bounds of the transmitting signal.

FIG. 1 illustrates an example of the geographic allocation for television transmission. This example further illustrates how geographic allocation allows for signal isolation to avoid interference. In this illustrative example, the Grade A and Grade B service coverage of the closely spaced cities of New York City, Philadelphia and Washington, D.C. are shown. To geographically isolate the transmission of, for example, broadcaster may transmit on channel 2 in New York and Washington and on channel 3 in Philadelphia. As shown, frequency and distance, i.e., transmitter power, are used to prevent interference among channels.

Although the above example is shown with regard to television frequency allocation, a similar frequency allocation is provided for other regulated transmission, such as radio (AM/FM/weather), satellite, and cellular telephone communications, etc. However, such exclusive licensing arrangements result in inefficient use of the radio spectrum as licensed services that are not commercially successful in the market do not broadcast in their allocated frequency band. Further, some services, for example, emergency calling and safety services/disaster relief communication services, only occasionally require the use of their allocated radio band. Further, some services may be active only for designated periods of time. Hence, resources are not efficiently used with the traditional regulation of the frequency spectrum.

On the other hand, communications systems for consumer electronics operate mainly in unlicensed frequency bands. Resources of the unlicensed frequency band are generally considered as being efficiently used because of the high penetration of unlicensed communication devices. With the rise of small distance wireless communications requiring extremely low transmission power, the use of exclusive allocation of frequency spectrum is impractical, burdensome and inefficient. However because of the demands imposed on such wireless systems, the uncontrolled use of the unregulated spectrum would cause significant conflicts and possible interference in frequency bands that are regulated.

Hence, there is a need in the industry for a method and system that allows for more efficient use of the frequency spectrum particularly for short distance wireless communications.

A method and system for efficiently utilizing frequency spectrum resources is disclosed. The method comprises the steps of determining at least one spectrum opportunity, wherein the opportunity is identified by a frequency range and a time duration, determining a set of altered transmission characteristics to allow transmission of a desired signal in the identified frequency range, wherein the altered transmission characteristics avoid interference with signals expected in the frequency range, and transmitting said desired signal using the altered transmission characteristics when the transmission occurs during said time duration. In one aspect of the system, the step of determining at least one opportunity comprises the steps of receiving signals in known frequency ranges, and determining the characteristics of the received signals. The system comprises a receiving unit for receiving information items regarding at least one receivable signal, a processing unit for determining characteristics of the at least one received signal, a managing unit for altering transmission characteristics of a desired signal based on the determined received signal characteristics, wherein the altered transmission characteristics avoid interference with the received signals and a transmission unit receiving said altered transmission characteristics to transmit said desired signal. In one aspect, the desired signal transmission characteristics are altered in a frequency range/time period to avoid interference with received signals in the frequency range.

FIG. 6b illustrates an example of the results of the processing shown in FIG. 6a;

Figure 1:
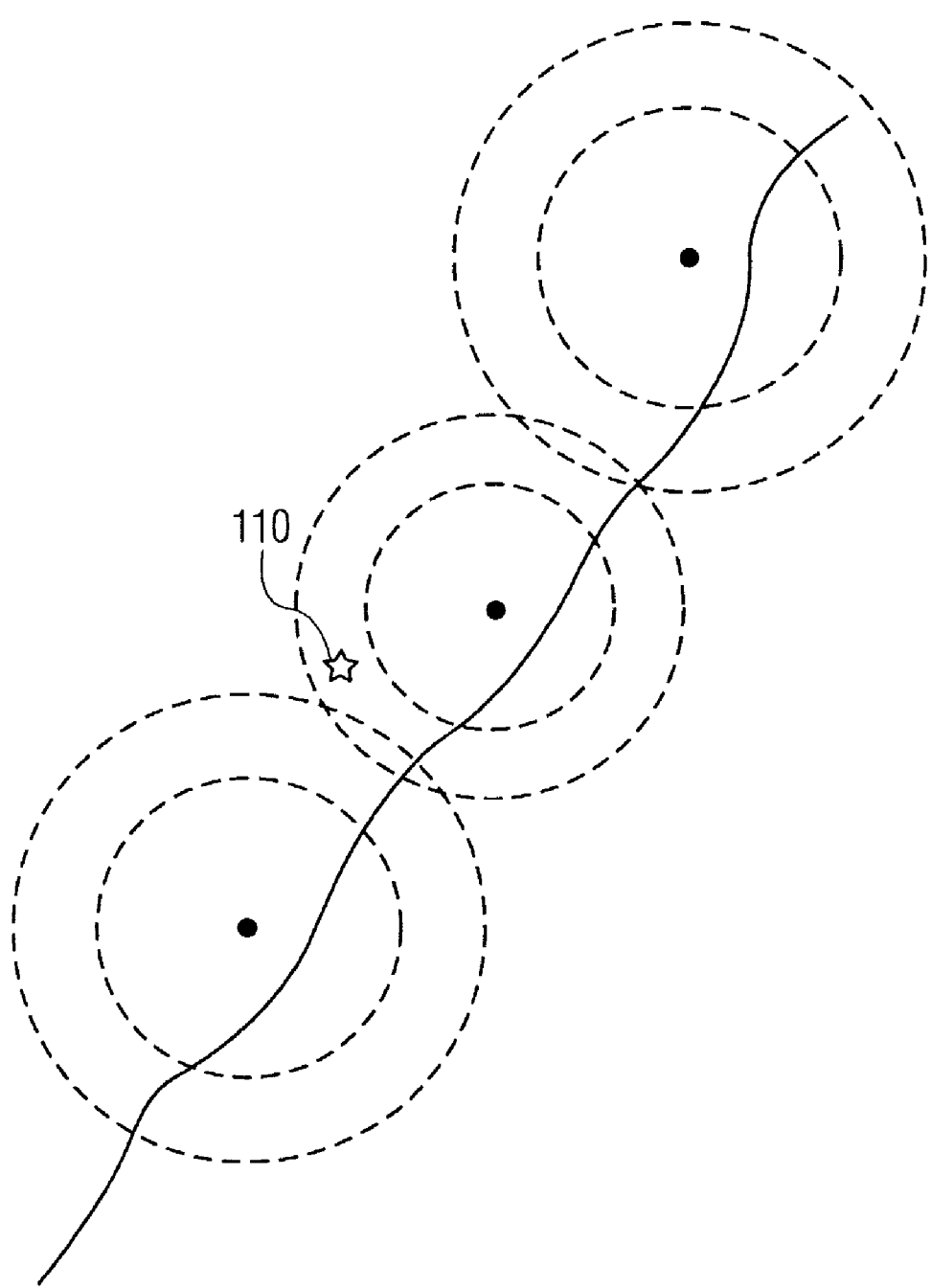
FIG. 1 illustrates the geographic dispersion of transmission sites to avoid signal interference.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

Ultra Wideband (UWB) technology is one attempt to provide sufficient radio spectrum for short-range wireless communications. It is also a candidate for the wireless personal area network (WPAN) standard IEEE 802.15.3a, accomplishing data rates in the range from 55 Megabit/s (Mb/s) to 480 Mb/s using a low-power transmission over a 1.5 GHz bandwidth. Recently, the Federal Communication Commission (FCC) has allocated a frequency band from 3.1 GHz to 10.6 GHz for the application of UWB transmission.

Figure 2:
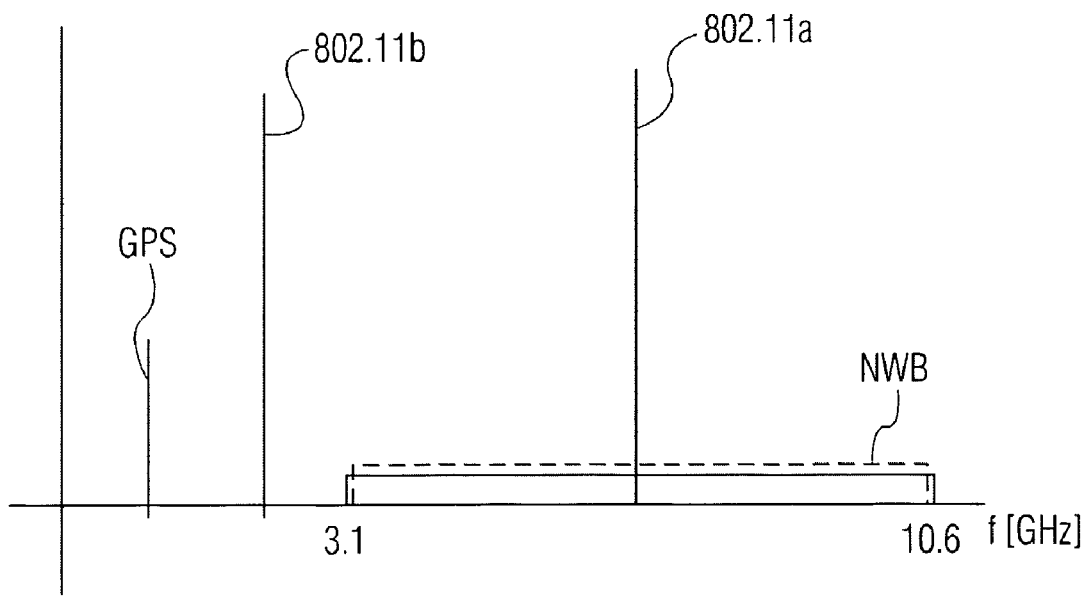
FIG. 2 illustrates a conventional power distribution for UWB transmission.

FIG. 2 illustrates a comparison (not to scale) of the transmission power spectrum of conventional wireless and UWB communications. As shown, the power output of UWB transmission is intended not to substantially exceed the ambient noise level of the electronic environment, for example, the unintentional radiated power produced by an operating computer system.

Figure 3:
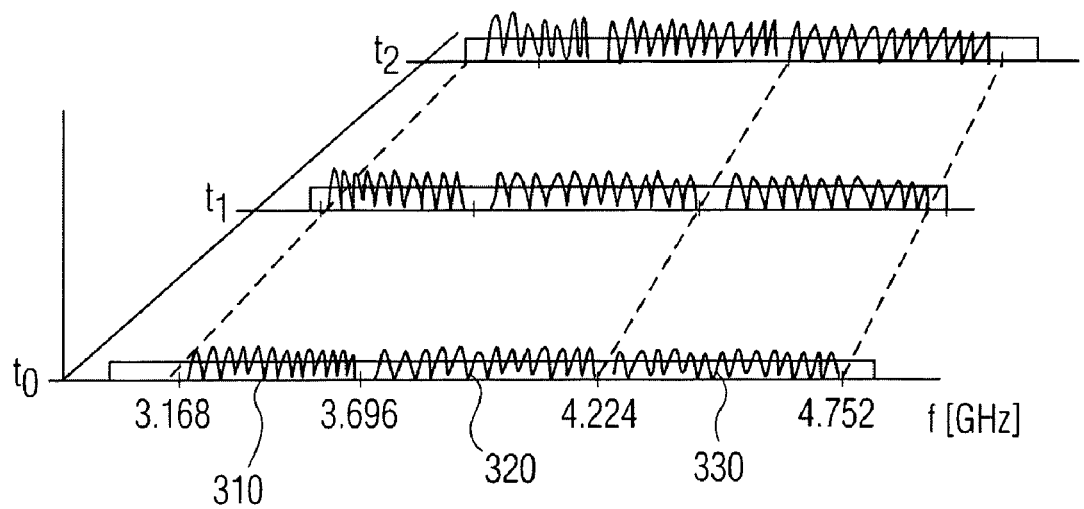
FIG. 3 illustrates an exemplary frequency/time UWB transmission.

FIG. 3 illustrates one application, proposed by the Multi-band OFDM Alliance (MBOA), for three UWB channels 310, 320, 330, each having a bandwidth in the order of 528 Mhz in the frequency range of 3.168 GHz to 4.752 GHz. Using UWB technology, data rates greater than 100 Mb/s may be transmitted over channels whose power output does not substantially exceed the nominal ambient noise level. Examples of applications suitable for UWB technology are wireless USB, high speed transfer of audio and image collections between consumer devices and personal computers, and high speed streaming of digital video between consumer devices. In the illustrated application, data is transmitted in each of the three channels at the designated time periods $t_0$, $t_1$ and $t_2$. In the interval between the identified transmission periods only the ambient noise level is present. As one skilled in the art would recognize, transmissions occur for a finite time period, e.g., $t_1$ to $\Delta t_1$, and this period has not been shown to avoid unnecessary confusion and complexity in the figure.

SARA (Spectrum Agile Radio) is a method that improves the efficiency of frequency spectrum usage by seeking opportunities, i.e., unused spectrum resources, to provide a transmission frequency or frequency range. Identifying spectrum opportunities is regulated by SARA policies, which are made available to SARA radio networks through, for example memory devices or by downloading them from a server, together with measurements to indicate the usage of spectrum. One of the main objectives of SARA is isolation of, and interference avoidance with, primary regulated services.

Figure 4A:
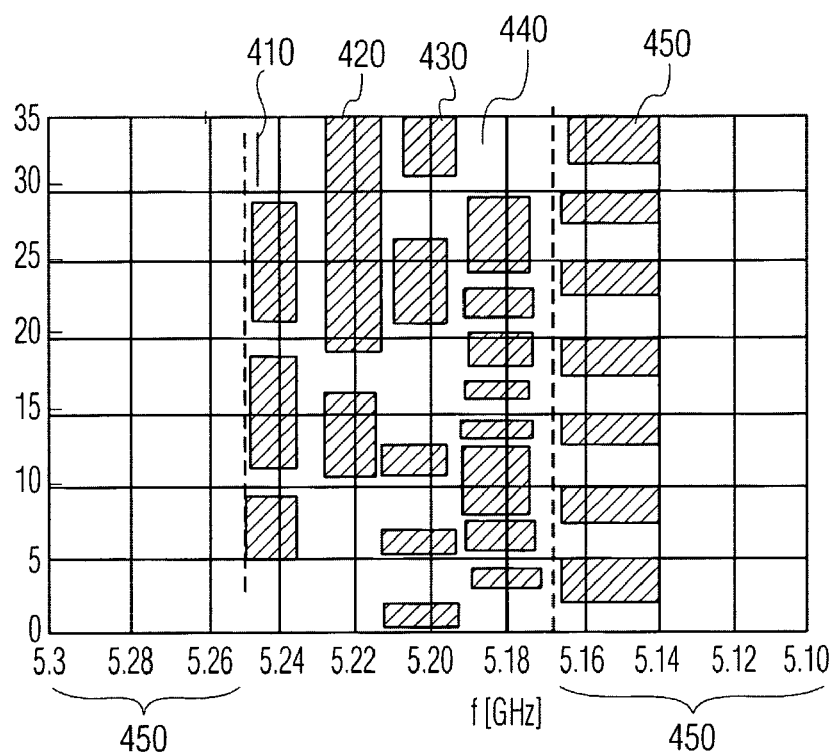
FIGS. 4a and 4b illustrate exemplary frequency/time transmission distribution and identification of spectrum opportunities.
Figure 4B:
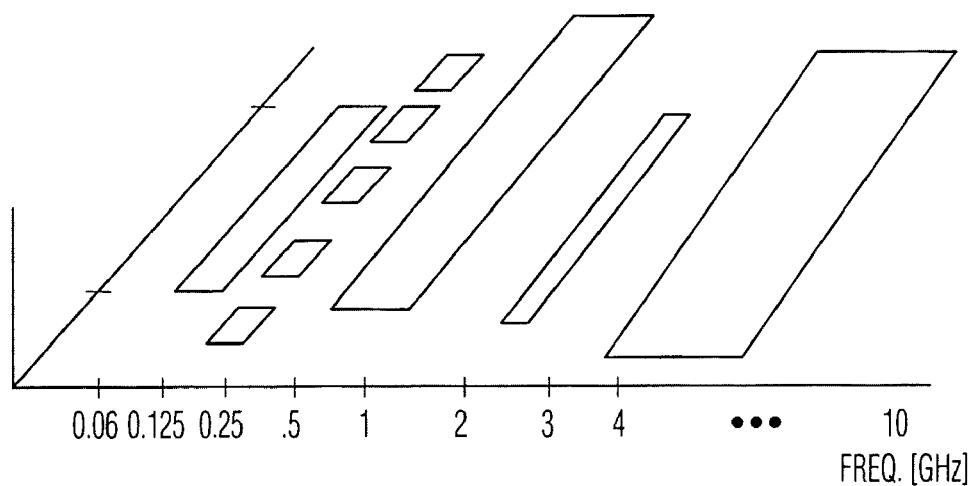

FIG. 4a illustrates spectrum usage of four IEEE 802.11a channels 410, 420, 430, 440 operating in the unlicensed 5 GHz frequency band and a periodic transmission 445 in the frequency band from 5.14 to 5.16 GHz. In accordance with one aspect of a SARA policy for the identifying spectrum opportunities, one spectrum opportunity is identified above the IEEE 802.11a channel band, i.e., region 450, and a second spectrum opportunity is identified below the periodic transmission 455, i.e., region 460. In another aspect of a SARA policy, additional spectrum opportunities may be identified within signal 455 at times 5-7 ms, 10-12 ms, 15-17 ms, etc., for example. FIG. 4b illustrates a second example of spectrum opportunities identified in a frequency/time domain. As shown, opportunities may be continuous or disjoint in time over more or more frequency bands. Devices employing SARA based technology may identify opportunities prior to the use of such opportunities.

Figure 5A:
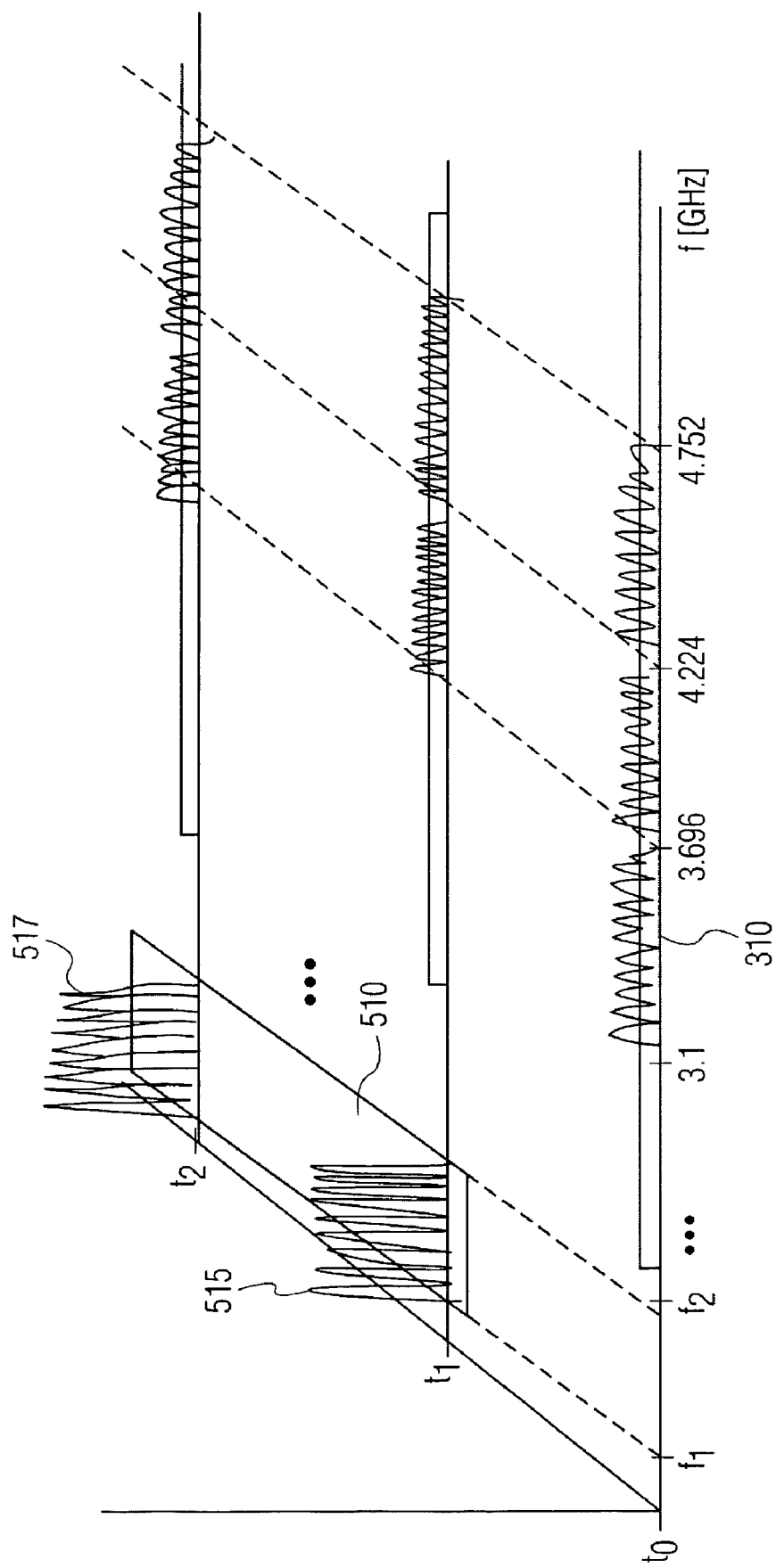
FIGS. 5a, 5b and 5c illustrate examples of frequency/time UWB transmissions in accordance with the principles of the invention.

FIG. 5a illustrates an example of UWB transmission employing SARA technology, for the UWB transmission shown in FIG. 1, in accordance with the principles of the invention. In this first example, spectrum opportunity 510 is determined to exist between frequency band f1 to f2 and time $t_1 - \Delta t_1$ to $t_{12} + \Delta t_{12}$. In this case, the transmissions scheduled to occur at times $t_1$ and $t_2$ in channel 1, 310 are shifted to the frequency band between f1 and f2, i.e., 515 and 517, respectively. Further the transmissions occur at a substantially higher power. The use of higher power is advantageous as it allows for the reception of the signal at greater distance or for the use of less bandwidth as fewer coding bits need be transmitted to receive the same level of quality of service.

Figure 5B:
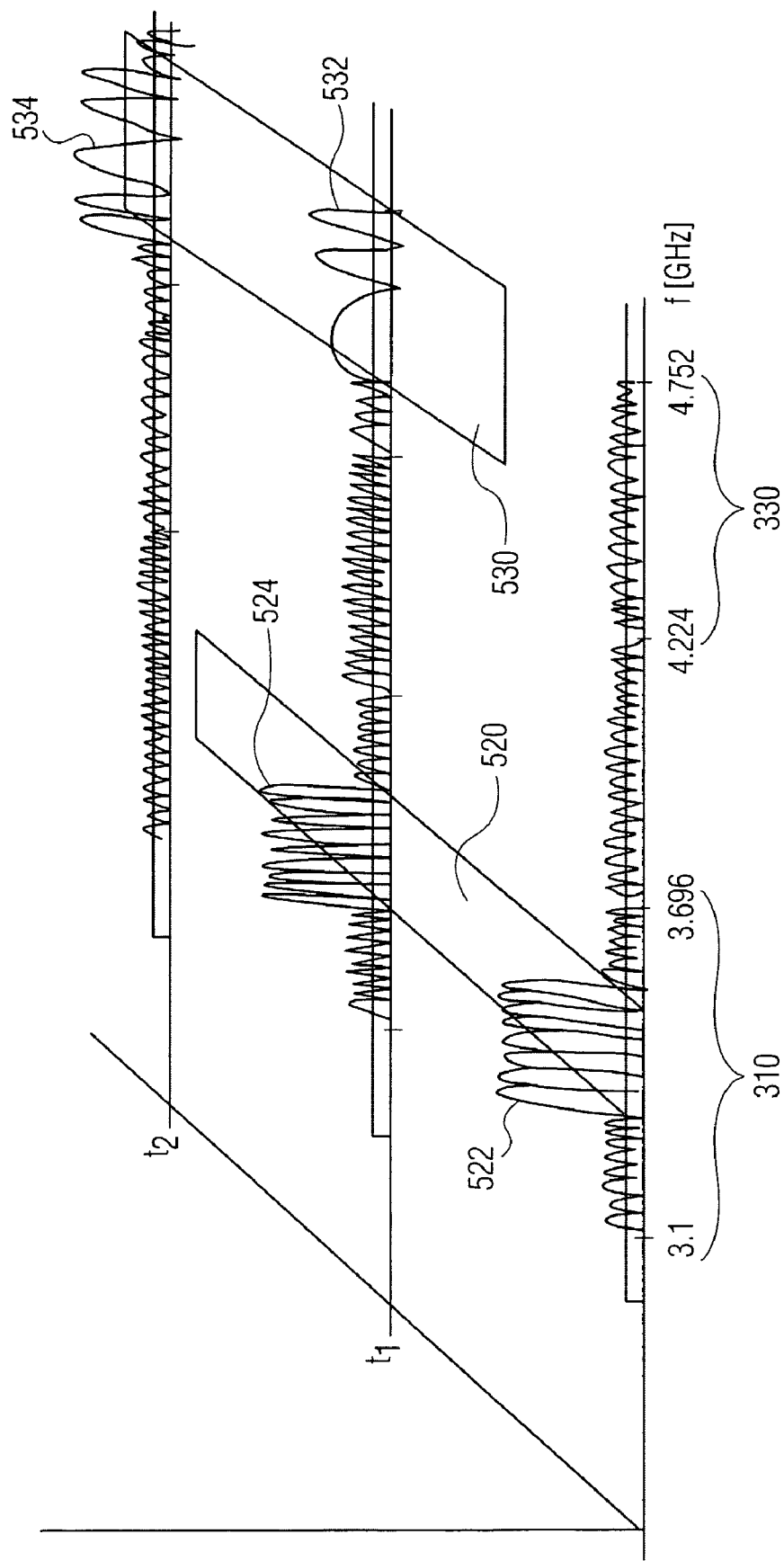

FIG. 5b illustrates a second example of UWB SARA transmission in accordance with the principles of the present invention. In this illustrative example, spectrum opportunity 520 is determined in a frequency sub-band within channel 1, 310 between time $t_0$ and $t_2 - \Delta t_2$ and opportunity 530 is determined in a frequency sub-band within channel 3, 330 between time $t_1 - \Delta t_1$ and $t_2 + \Delta t_2$. In this case, when sub-carrier frequencies within channel 1, 310 fall within the designated sub-band specified by opportunity 520, the transmission characteristics of the transmission are altered or adjusted to take advantage of the opportunity. In this case, the power is increased for transmissions that occur at time $t_0$ and $t_1$, i.e., 522 and 524, respectively, in the designated sub-band. It should be noted that at time $t_2$ the signals are transmitted with a nominal power as the window of opportunity 520 has closed.

Similarly, when a signal transmitted in channel 3, 330 is transmitted at time $t_1$ and $t_2$, the transmission characteristics are altered when the sub-carrier frequencies fall within the frequency band associated with spectrum opportunity 530. In this case, the alteration in transmission characteristics is both in power and in modulation rate. Alterations may also occur in characteristics or parameters such as modulation type, coding rate, etc., as one skilled in the art would recognize.

Figure 5C:
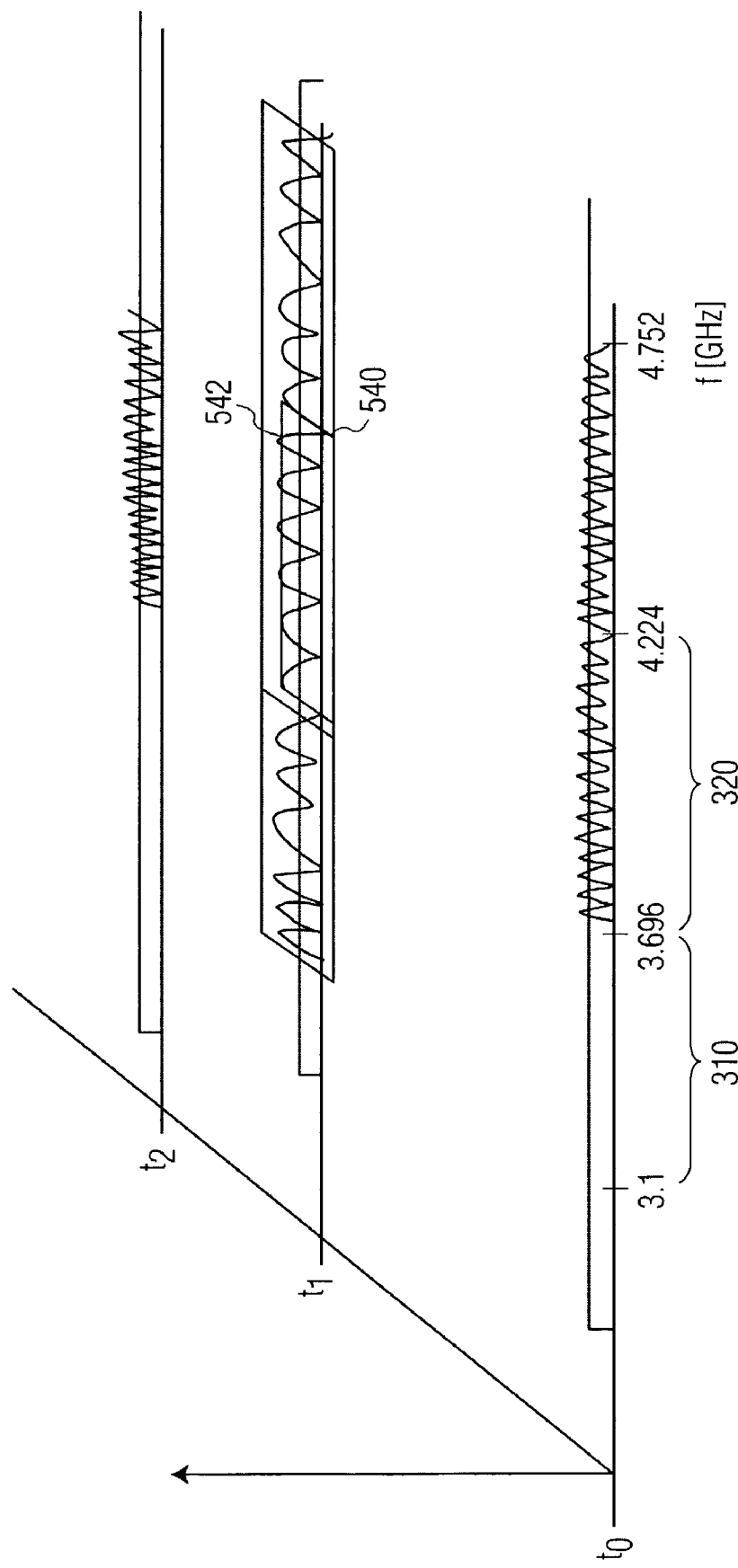

FIG. 5c illustrates another example of a UWB SARA operation in accordance with the principles of the invention. In this example, the spectrum that is scanned or measured is in frequency range extending from channel to channel 3 between times $t_1 - \Delta t_1$ and $t_1 + \Delta t_1$. In this case, for the purposes of measurement, the transmission characteristic is adjusted out of the sub-channel bandwidth. It would be recognized by those skilled in the art, that the bandwidth for measurement need not be adjacent or continuous as shown, but may be extended to multiple bands that may be disjoint, non-adjacent and/or non-continuous.

Figure 6A:
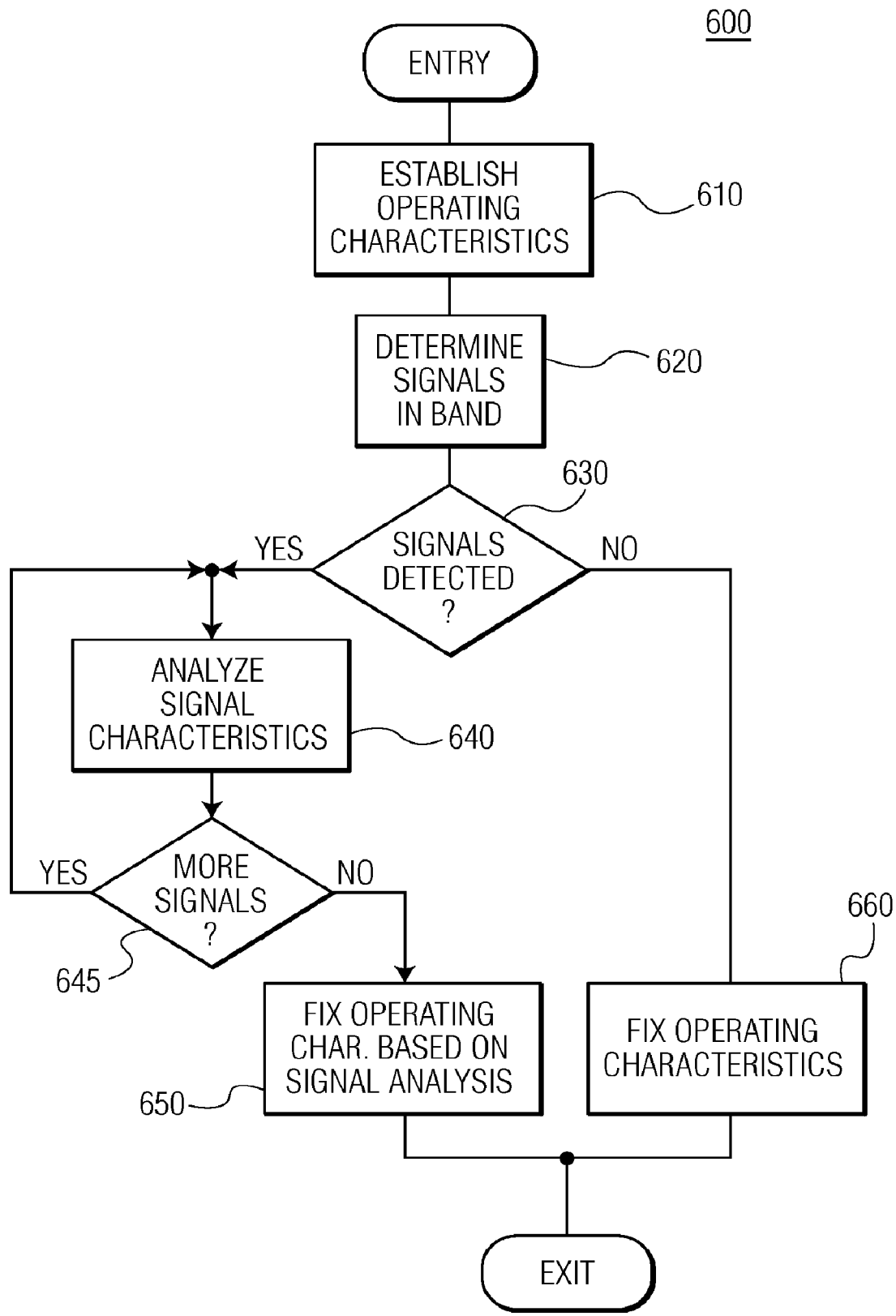
FIG. 6a illustrates a flow chart of processing in accordance with the principles of the invention.

FIG. 6a illustrates a flow chart of an exemplary process 600 for determining spectrum opportunities in accordance with the principles of the invention. In this aspect of the invention, operating parameters or characteristics of the UWB SARA empowered device are established at block 610. At block 620 a determination is made regarding the usage of radio spectrum in desired or selected frequency bands. At block 630, a determination is made whether signals are present in the desired or selected frequency bands. If the answer is negative, then the operating conditions are fixed, e.g., default values, at block 660. However, if the answer is in the affirmative, then an analysis of the signal characteristics is performed at block 640 and the results stored.

At block 645, a determination is made whether more signals are present. If the answer is in the affirmative, then processing continues at block 640 for analysis of the remaining signals. However, if the answer is negative, then the operating characteristics are determined, at block 650, based on the signal analysis.

Figure 6B:
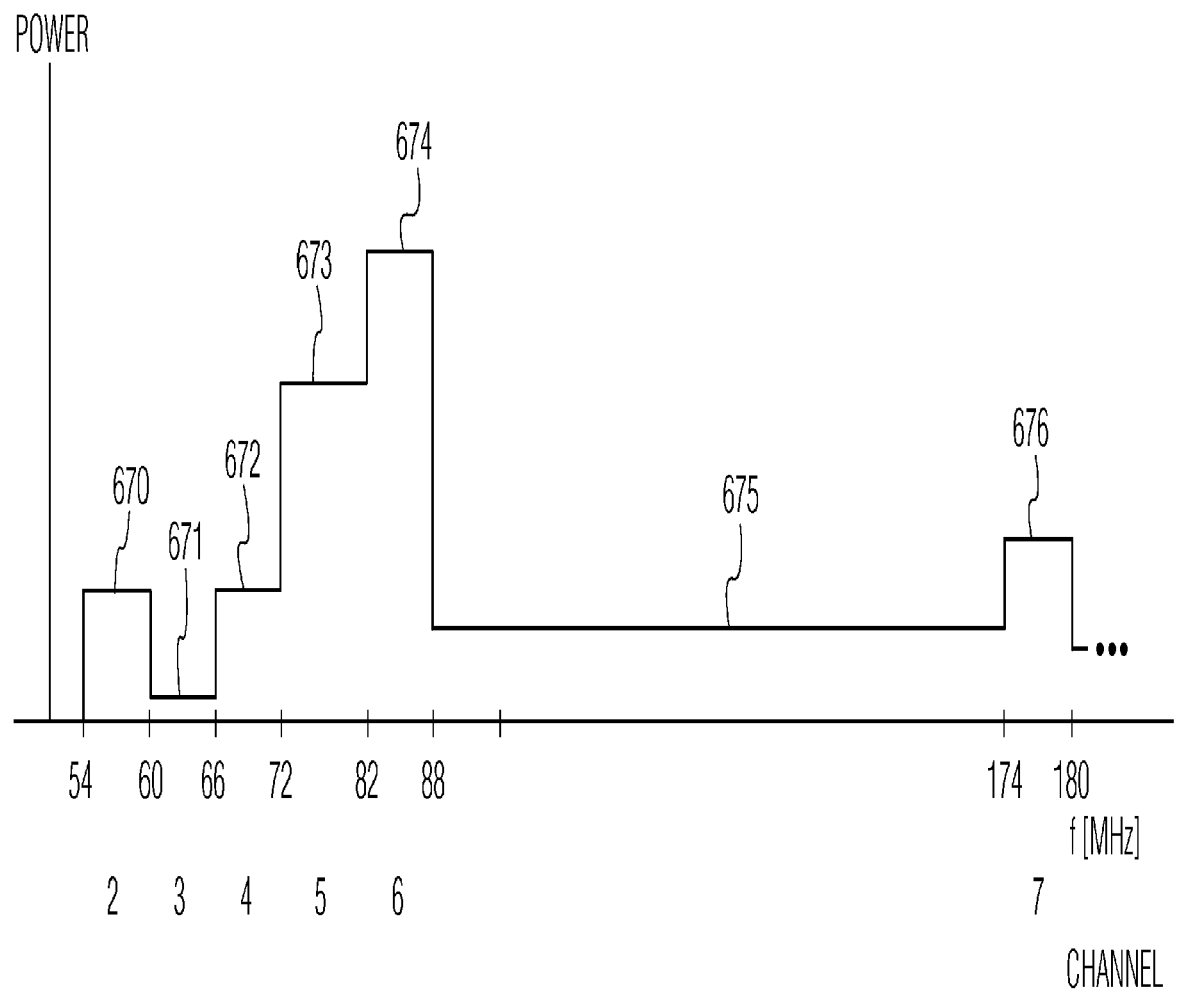

FIG. 6b illustrates an exemplary power transmission characteristic determined in accordance with the principles of the invention using the example shown in FIG. 1. Returning to FIG. 1, UWB SARA empowered device 110 is located between the cities of Philadelphia and Washington, D.C. and may determine, by reception, signals on channels 2, 3, 4, 5 and 7 emanating from the surrounding cities. In this case, channels 2, 4 and 7 emanate from Washington, D.C. and New York, channel 3 emanates from Philadelphia and channel 5 also emanates from New York. As would be recognized, the received power on each channel depends on the transmitter output power, the distance between the transmitter and receiving device 110, the sensitivity of receiving device 110 and the weather conditions. As would be recognized, the signals on channel 2 emanating from New York may not be detected as the signals on channel 2 emanating from Washington may be of a significantly higher received power or the transmission signal power may be too low to reach device 110. However, in this example, receiving device would have been able to detect channels 2, 3, 4, 5 and 7.

Returning to FIG. 6b, in this illustrated case, the transmission power level on sub-carrier frequencies within channels 2, 4 and 7 is established at a first power level, i.e., 670, 672 and 676, to avoid interference with channels 2, 4 and 5 emanating from Washington. The transmission power level on sub-carrier frequencies within channel 3 is set at a nominal power level, 672, to avoid interference with channel 3 emanating from Philadelphia and the transmission power levels on sub-carrier frequency in channel 5 is set at a second, 673, to avoid interference with channel 5. As no signal is detected or determined to exist on channel 6, a maximum power level, 674, may be set. Although not shown in detail, one skilled in the art would recognize that a similar operation may be performed in the FM band, between 88 and 174 MHz. In this illustrative example, the power level is shown set to a fixed level 675.

Although the above example described the present invention with regard to detecting and analyzing the signal environment, one skilled in the art would also recognize that the signal environment may be determined by knowing the location of device 110 and the location and transmitting power of each transmitting site, Further, the received power at the receiving site may be determined using well-known formula for estimating received signal strength based on frequency, distance, transmitting power and attenuation. In one case, the location of device 110 may be provided by a manual input, while in another case, a global positioning satellite (for example GPS) may provide the location.

Figure 7:
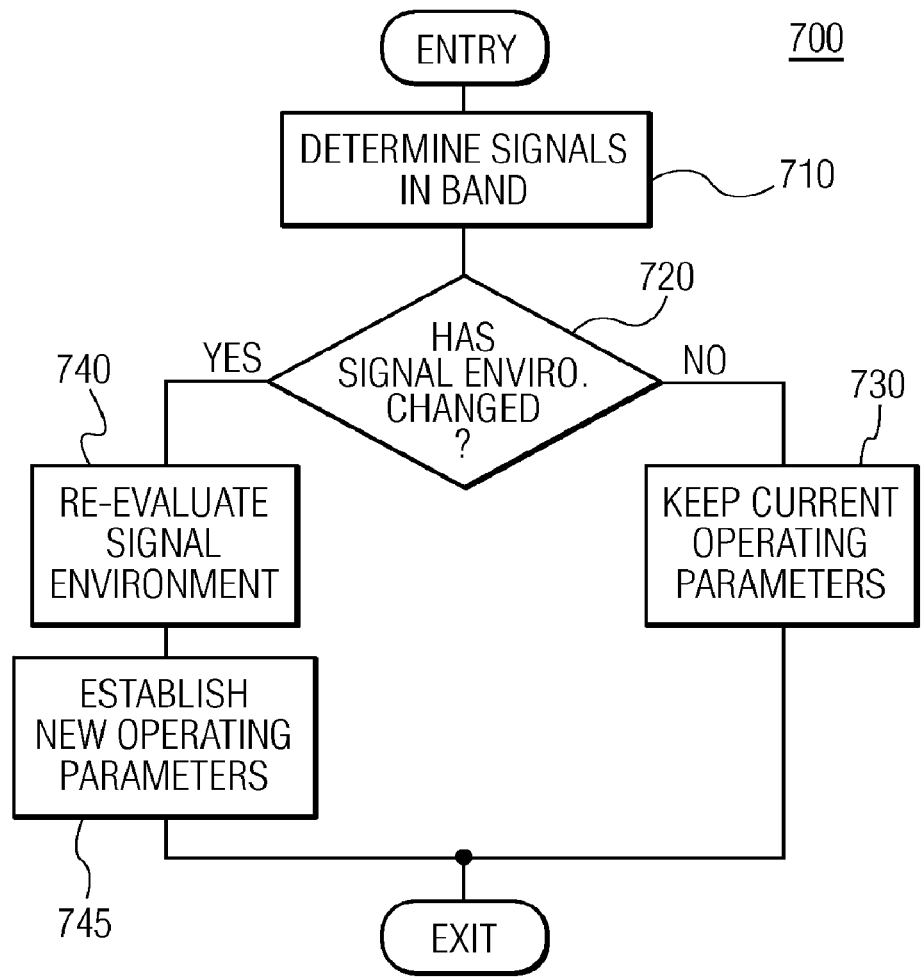
FIG. 7 illustrates a flow chart of a second exemplary process in accordance with the principles of the invention.

FIG. 7 illustrates flow chart of processing 700 in another aspect of the invention. In this aspect of the invention, the signals in the electronic environment are determined at block 710. At block 720, a determination is made whether the electronic environment has changed. If the answer is negative, then the current operating parameters are maintained at block 730. However, if the answer is in the affirmative, then the signal environment is re-evaluated at block 740 and new operating parameters are established at block 745. The processing shown in FIG. 7 may be initiated on a periodic basis, a predetermined time from a prior execution, a known event or an unknown event. For example, the processing shown may be initiated if the device 110 is in motion and transported to another location, if a threshold level of interference level is encountered, exceeding a bit-error rate threshold level, if the regulated signals are known to turn off and on at specified times or combinations of these and other similar criteria.

Figure 8:
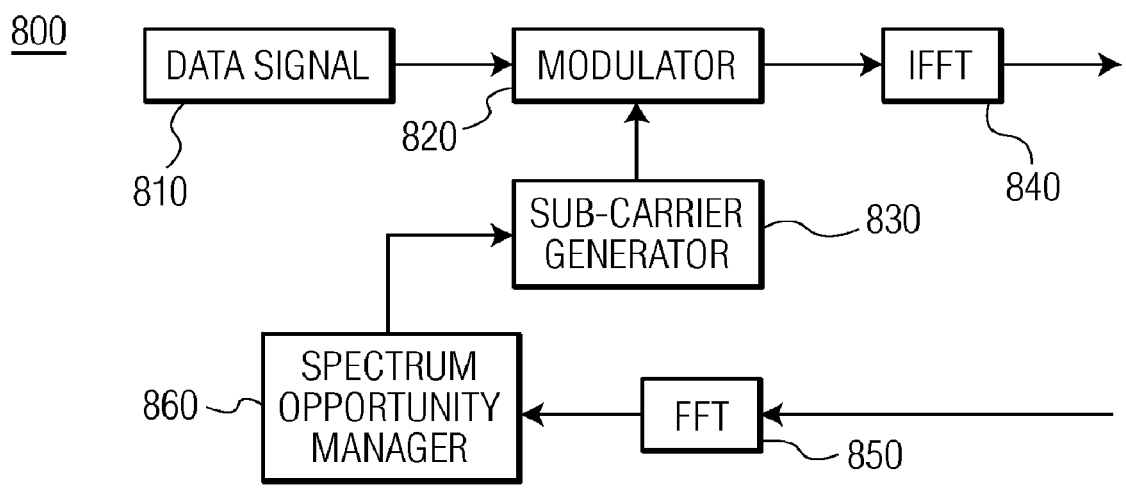
FIG. 8 illustrates a block diagram depicting the processing flow in accordance with the principles of the invention.

FIG. 8 depicts a block diagram 800 illustrating a process flow in accordance with the principles of the invention. In this exemplary block diagram, data 810 is provided to modulator 820 to superimpose or modulate the data 810 onto sub-carrier frequencies provide by sub-carrier generator 830. The modulated sub-carrier frequencies are then provided to IFFT (Inverse Fast Fourier Transform) 840 for coding and subsequent transmission at designated times.

Signals are further received by the system 800 and, in this illustrated example, decoded by FFT 850 and provided to spectrum opportunity manager (SOM) 860. The output of SOM 860 is provided to sub-carrier generator 830 to cause the adjustment of the transmission characteristics on the next/subsequent transmission based on an analysis of the received signals. As discussed above, the time of reception the received signals may be at periodic or at fixed times or the occurrence of a known event.

Figure 9:
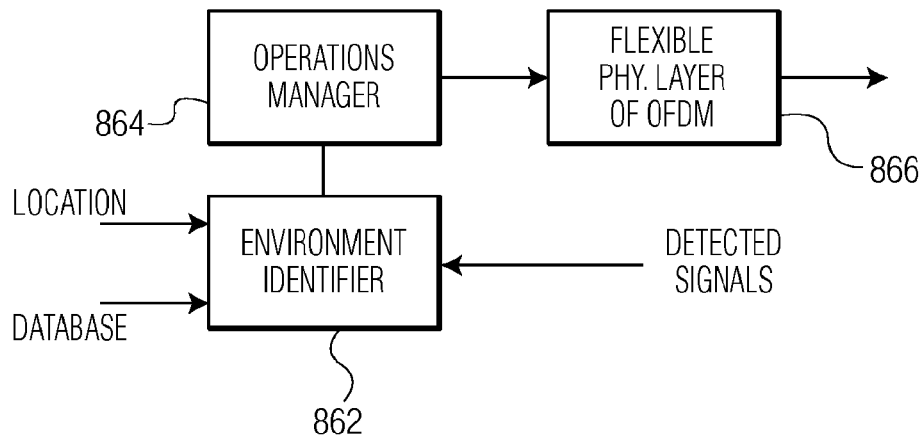
FIG. 9 illustrates a block diagram of the processing flow of a spectrum opportunity manager shown in FIG. 8.

FIG. 9 depicts a block diagram of the process flow of SOM 860 shown in FIG. 8. In this exemplary process flow, environment identifier 862 receives information items regarding the electronic environment based on detected signal and/or location and a database of known signals. For example, database(s) of known regulated signals, prepared by the FCC, which controls the regulation of the frequency spectrum, may be received and the information items may be used in conjunction with transmitter locations to determine the signal environment expected at a receiving site, as previously described.

The determined or identified signals are provided to the operations manager 864, which determines the transmission characteristics of next/subsequent transmissions based on the identified signals. The transmission characteristics of next/subsequent transmission may be altered in order to cause a change in a next/subsequent transmission. In one aspect, the transmission parameters of the physical layer of the conventional OSI 7-layer stack network may be altered. The altered transmission parameters are then provided to sub-carrier generator 830 to implement the transmission.

Figure 10:
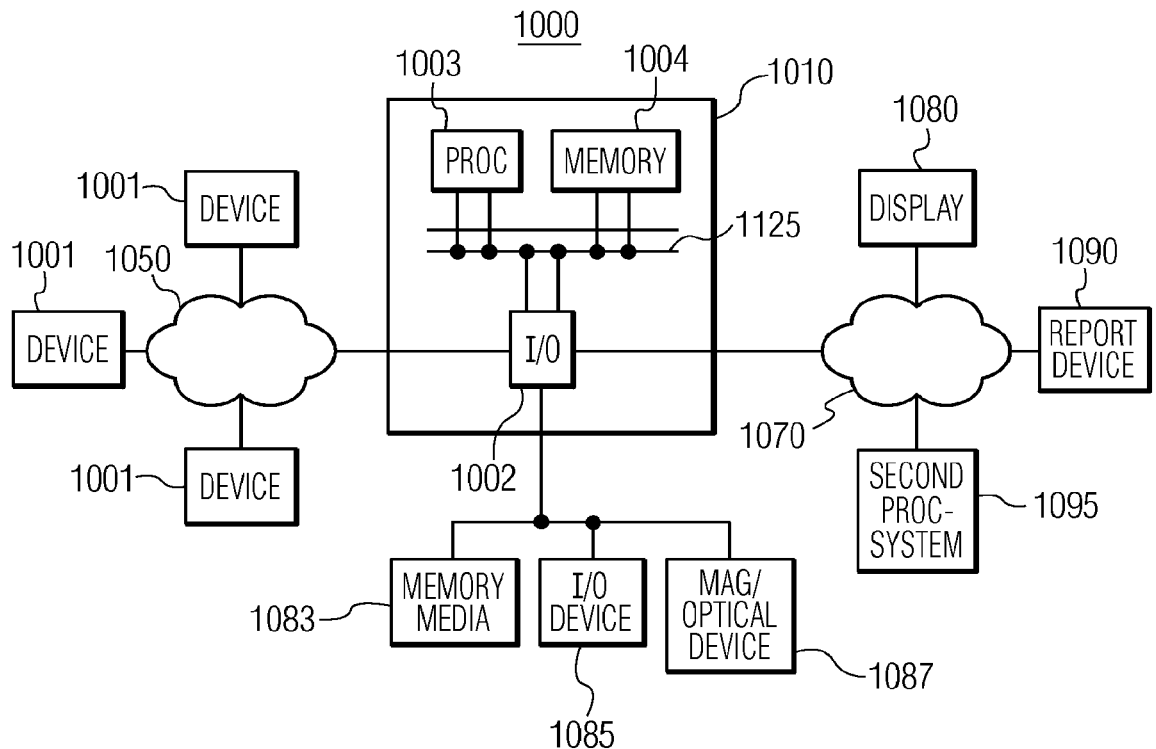
FIG. 10 illustrates a processing system for executing the processing shown herein.

FIG. 10 illustrates an exemplary embodiment of a system 1000 that may be used for implementing the principles of the present invention. System 1000 may contain one or more input/output devices 1002, processors 1003 and memories 1004. I/O devices 1002 may access or receive information from one or more sources 1001 regarding signal information. Sources 1001 may be devices such as receiving systems, computers, notebook computers, PDAs, cells phones or other receiving devices or systems. Sources 1001 may provide the information over one or more network connections 1050 via, for example, a wireless wide area network, a wireless metropolitan area network, a wireless local area network, a terrestrial broadcast system (Radio, TV), a satellite network, a cell phone, or a wireless telephone network, wired networks, internal communication busses, internal connections, as well as portions or combinations of these and other types of networks.

Input/output devices 1002, processors 1003 and memories 1004 may communicate over a communication medium 1025. Communication medium 1025 may represent, for example, a bus, a communication network, one or more internal connections of a circuit, circuit card or other apparatus, as well as portions and combinations of these and other communication media. Input data from the sources 1001 is processed in accordance with one or more programs that may be stored in memories 1004 and executed by processors 1003. Processors 1003 may be any means, such as general purpose or special purpose computing system, or may be a hardware configuration, such as a laptop computer, desktop computer, a server, handheld computer, dedicated logic circuit, or integrated circuit. Processors 1003 may also be Programmable Array Logic (PAL), Application Specific Integrated Circuit (ASIC), etc., which may be hardware programmed to include software instructions that provide a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In a one aspect, the principles of the present invention may be implemented by computer readable code executed by processor 1003. The code may be stored in the memory 1004 or read/downloaded from a memory medium 1083, an I/O device 1085 or magnetic, optical media, 1087, such as memory stick, flash card, a floppy disk, a CD-ROM or a DVD.

Inputs from source 1001 received by I/O device 1002 after processing in accordance with one or more software programs operable to perform the functions illustrated herein may also be transmitted over network 1070 to one or more output devices represented as display 1080, reporting device 1090 or second processing system 1095, e.g., sub-carrier generator 830 (FIG. 8).

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method for efficiently utilizing spectrum resources, comprising:
   determining multiple spectrum opportunities, wherein each opportunity is identified by a frequency range and a time duration;
   determining whether signals are present in said identified frequency range, wherein if the signals are present, then analyzing said signals and determining the characteristics of said signals;
   if the signals are not present in said identified frequency range, then transmitting desired signals using fixed operating conditions;
   wherein if the signals are present in said identified frequency range, then
   determining a set of altered transmission characteristics based on the determined signal characteristics to allow for transmission of a desired signal in said identified frequency range, wherein said altered transmission characteristics avoid interference with signals expected in said frequency range; and
   transmitting said desired signal over the multiple spectrum opportunities simultaneously using said altered transmission characteristics when said transmission occurs during said time duration;
   wherein said determining multiple spectrum opportunities comprises:
     determining a location of a receiving device;
     obtaining location and transmission characteristics for known transmitters from at least one database; and
     determining an estimated received signal characteristics based on the location and transmission characteristics of said transmitters and a location of said receiving device.

2. The method as recited in claim 1, further comprising:
   determining a time period of reception of said received signals.

3. The method as recited in claim 1, wherein said received signal characteristics are selected from the group consisting of: received power, modulation, modulation rate and bandwidth.

4. The method as recited in claim 1, wherein said receiving device location is selected from the group consisting of: GPS location, and manual input.

5. The method as recited in claim 1, wherein an occurrence of said determining multiple spectrum opportunities is performed at a rate selected from the group consisting of: periodic, time lapse from a prior occurrence, on a known event.

6. A device for effectively utilizing frequency spectrum resources, comprising:
   a memory;
   a receiving unit for receiving signals and providing received signal characteristics to a processor;
   said processor, in communication with said memory, executing code for:
   receiving information items regarding multiple spectrum opportunities, wherein each opportunity is identified by a frequency range and a time duration;
   determining whether signals are present in said identified frequency range, wherein if the signals are present, then analyzing said signals and determining the characteristics of said signals;
   if the signals are not present in said identified frequency range, then transmitting desired signals using fixed operating conditions;
   wherein if the signals are present in said identified frequency range, then
   determining a set of altered transmission characteristics based on the determined signal characteristics to allow for transmission of a desired signal in said identified frequency range, wherein said altered transmission characteristics avoid interference with signals expected in said frequency range;
   enabling transmission of said desired signal over the multiple spectrum opportunities simultaneously using said altered transmission characteristics when transmission of said desired signal occurs during said time duration; and determining said multiple spectrum opportunities information items based on location and transmitting characteristics of known transmitting signals stored in a database and a location of said device.

7. The device as recited in claim 6, wherein said processor further executing code for;

determining said multiple spectrum opportunities information items based on said received signal characteristics.

8. The device as recited in claim 6, further comprising:
an input/output unit in communication with said processor and said memory.

9. The device as recited in claim 6, wherein said code is stored in said memory.

10. The device as recited in claim 6, further comprising:
a transmitting unit for transmitting said desired signal.

11. A wireless communication system, comprising:
a receiving unit for receiving information items regarding at least one receivable signal;
a processing unit for determining multiple spectrum opportunities, wherein each opportunity is identified by a frequency range and a time duration, and for determining whether signals are present in said identified frequency range, wherein if the signals are present, then analyzing said signals and determining the characteristics of said signals;
a managing unit for altering, if the signals are present in said identified frequency range, transmission characteristics of a desired signal based on said at least one spectrum opportunity and said determined received signal characteristics, wherein said altered transmission characteristics avoid interference with said received signals; and
a transmission unit receiving said altered transmission characteristics to transmit said desired signal over the multiple spectrum opportunities simultaneously using said altered transmission characteristics, and if no signals are present in said identified frequency range said transmission unit is arranged to send desired signals using fixed operating conditions, wherein said receiving unit includes a processor for receiving information associated with location and transmission characteristics of known transmitting signals and said information items are determined from said location and transmission characteristics of said known transmitting signals.

12. The system as recited in claim 11, wherein said altered transmission characteristics are selected from the group consisting of: power, modulation, modulation type, and coding rate.

13. The system as recited in claim 11, wherein said desired signal transmission power in a frequency range of said received signals is substantially higher when said received signals are not present.

14. The system as recited in claim 11, wherein said desired signal transmission characteristics are altered in a frequency range/time period to avoid interference with received signals in said frequency range.

* * * * *